United States Patent
Smith et al.

(10) Patent No.: US 6,886,754 B2
(45) Date of Patent: May 3, 2005

(54) THERMOSTAT OPERABLE FROM VARIOUS POWER SOURCES

(75) Inventors: Blaine M. Smith, Portland, OR (US); Timothy M. Simon, San Francisco, CA (US)

(73) Assignee: Tim Simon, Inc., San Francisco, CA (US)

( * ) Notice: Subject to any disclaimer, the term of this patent is extended or adjusted under 35 U.S.C. 154(b) by 108 days.

(21) Appl. No.: 10/453,840

(22) Filed: Jun. 3, 2003

(65) Prior Publication Data

US 2004/0245349 A1 Dec. 9, 2004

(51) Int. Cl.[7] .............................................. G23D 23/30
(52) U.S. Cl. ........................ 236/10; 62/298; 236/78 R
(58) Field of Search .......................... 236/10, 11, 78 R, 236/78 A, 78 B, 78 C, 78 D, 94, 46 R; 165/253, 254, 255, 256, 257, 258, 259, 11.1; 62/236, 298, 126

(56) References Cited

U.S. PATENT DOCUMENTS

| | | | |
|---|---|---|---|
| 3,284,002 A | * 11/1966 | Edelman et al. | 236/68 B |
| 3,599,710 A | * 8/1971 | Joslin | 236/11 |
| 4,632,303 A | * 12/1986 | Rodittis | 236/10 |
| 4,889,179 A | * 12/1989 | Merenda | 165/253 |
| 5,957,374 A | * 9/1999 | Bias et al. | 236/78 R |
| 6,595,430 B1 | 7/2003 | Shah | |

* cited by examiner

*Primary Examiner*—Harry B. Tanner
(74) *Attorney, Agent, or Firm*—James F. Hann; Haynes Beffel & Wolfeld LLP (57) ABSTRACT

A thermostat is operable from battery, common-wire ("C-wire"), or furnace relay power. The thermostat includes a power source selector, such as a jumper wire, that is set when the thermostat is installed in a heating system. In a gas millivolt heating system, the thermostat operates off of battery power. In heating systems having a C-wire, a diode bridge converter converts alternating-current voltage to direct-current voltage to provide operating power to the thermostat. In heating systems without a C-wire and having sufficient furnace relay current, a triac converter in series with the furnace relay provides voltage spikes to the diode bridge converter to provide operating power to the thermostat when the furnace is on, and the diode bridge converts AC to DC voltage when the furnace is not on. The thermostat can also be used in cooling systems and heating, ventilation, and air-conditioning systems. Thus, the thermostat can be used in a wide variety of applications.

15 Claims, 8 Drawing Sheets

THERMOSTAT OPERABLE FROM VARIOUS POWER SOURCES

CROSS-REFERENCE TO RELATED APPLICATIONS

This patent application is being concurrently filed with U.S. patent application Ser. No. 10/453,854 entitled THERMOSTAT WITH TOUCH-SCREEN DISPLAY by Blaine M. Smith, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to thermostats used for heating and cooling systems, such as domestic gas or electric furnaces, and more particularly to a thermostat that can operate from any of a variety of power sources.

BACKGROUND OF THE INVENTION

Thermostats are used to control a variety of heating and cooling systems. A variety of thermostats have been developed for use with the various types of heating systems. For example, domestic gas or electric furnaces often include a transformer that steps 115 VAC down to 24 VAC for operating the furnace relay. Some of these furnaces provide 24 VAC between a common wire and a heating transformer power wire. Other furnaces do not provide a common wire, but provide 24 VAC between the heating load wire and the heating transformer power wire. Gas millivolt systems do not typically provide 24 VAC, but only a very small-signal voltage between the heating load wire and the heating transformer power wire. Many thermostats are designed to work with a particular type of system, even though they all generally operate by closing or opening a connection between the heating load wire and the heating transformer power wire to turn the furnace on or off, respectively.

If a user wants to replace a thermostat in a heating system, he generally needs to know what type of system he has. Hardware stores need to stock a variety of thermostats for the various applications, and the user often has to return home to determine what sort of heating system he has, and hence what sort of thermostat he needs. It is therefore desirable to provide a thermostat that can be used in a variety of heating systems.

BRIEF SUMMARY OF THE INVENTION

A thermostat according to embodiments of the present invention is operable from a variety of power sources and can be used with a variety of heating and cooling systems. In one embodiment, the thermostat has a heating transformer power terminal, a heating load terminal, a common terminal, and a power source selector configurable to operate the thermostat from alternating-current voltage provided between the common terminal and the power terminal when the power source selector is in a first position, and configurable to operate the thermostat from alternating-current voltage provided between the heating transformer power terminal and the heating load terminal when the power source selector is in a second position.

In a further-embodiment, the thermostat includes a battery and the thermostat operates from battery power when alternating-current voltage is not provided to the thermostat. A low-battery detector senses battery voltage and indicates a low battery condition when the battery voltage drops below a pre-selected limit. The pre-selected limit of the battery voltage is greater than the voltage required to run the thermostat controller.

The thermostat controller can run off of alternating-current voltage converted to direct-current voltage by a diode bridge converter, and can operate off of the battery if the alternating-current voltage is interrupted or unavailable. When the power source selector is in the second position, the heating transformer power terminal is coupled to the heating load terminal through a triac converter when the furnace relay is on. The triac converter produces voltage spikes that are converted to direct-current voltage by the diode bridge converter. When the furnace relay is off, alternating-current power between the heating transformer power terminal and the heating load terminal is provided across the diode bridge converter and converted to direct-current voltage. The direct-current voltage from the diode bridge converter is coupled to a power supply that produces a regulated direct-current voltage for operation of the thermostat.

The triac converter is bypassed when the power source selector is in the first position. If alternating-current voltage is present between the common terminal and the heating load terminal, the diode bridge converter produces direct-current voltage that is provided to the power supply. The regulated direct-current voltage produced by the power supply is slightly greater than the battery voltage, which preserves the battery. Bypassing the triac converter when the source selector is in the first position allows operation of gas millivolt systems using the thermostat off battery power.

DETAILED DESCRIPTION OF THE INVENTION

I. Exemplary Thermostat Operable from Various Power Sources

Figure 1:
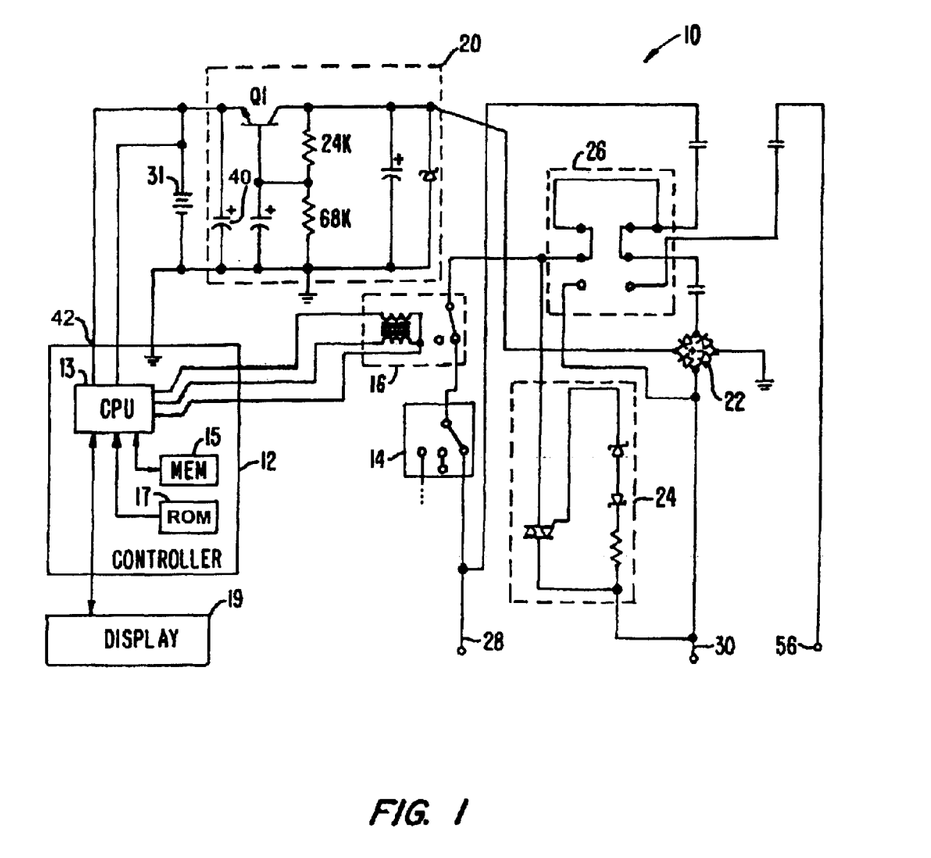
FIG. 1 is a simplified circuit diagram of a thermostat according to an embodiment of the present invention.

FIG. 1 is a simplified circuit diagram of thermostat 10 according to an embodiment of the present invention. Thermostat 10 includes thermostat controller 12, MODE switch 14 (see also FIG. 3), latching relay 16, power supply 20, diode bridge converter 22, triac converter 24, and power source selector 26. Thermostat controller 12 is generally an electronic device that includes a digital central processing unit ("CPU") 13, a programmable memory 15, a read-only memory 17, and analog circuitry (not separately shown), and draws an average of about 50 micro-Amps. Latching relay 16, and hence thermostat controller 12, draw about 50 mA when latching relay 16 is being switched ON or OFF, but only needs this higher current for a short period because latching relay 16 is magnetically latching.

In some embodiments, thermostat 10 includes a display 19. If the display 19 is a touch-screen display (see FIG. 3, ref. num. 100), information can be entered from the display 19 to CPU 13 and stored in programmable memory 15.

Thermostat 10 can be used with gas, oil, or electric heating and air conditioning systems, single-stage heat pumps; 2-wire and 3-wire zoned hot water systems or gas millivolt heating systems. Thermostat 10 turns a heating system on by shorting heating load terminal 28 (commonly called the "W" terminal in heating, venting, and air-conditioning "HVAC" systems) to heating transformer power terminal 30 (commonly called the "Rh" terminal in HVAC systems) through latching relay 16. When heating load terminal 28 is disconnected from heating transformer power terminal 30 (by opening latching relay 16), the heating system turns off.

One feature of thermostat 10 is that it can be installed as a replacement thermostat on many different heating systems. For example, a gas millivolt system does not typically have twenty-four volts supplied to the thermostat. Thermostat 10 can operate off of battery 31 for these systems. Some gas and electric heating systems provide a common wire (commonly called the "C-wire" in HVAC systems) to the thermostat, and thermostat 10 can operate off the 24 VAC between the common terminal 56 and heating transformer power terminal 30. The diode bridge converter 22 converts the 24 VAC to direct-current voltage and provides it to power supply 20 in these systems. In an electric heating system that does not provide a C-wire but does have 24 VAC between the heating transformer power terminal 30 and heating load terminal 28, thermostat 10 can operate off power provided from triac converter 24 to diode bridge converter 22. If 24 VAC power is lost, thermostat controller 12 can maintain its settings (operating program) by operating off of battery 31.

Thermostat controller 12 has a low battery detector 38 that senses the voltage of battery 31. Capacitor 40 across battery 31 provides a low-impedance path for transients that might otherwise appear at 3 VDC power input 42, and stores charge to provide additional current for operating latching relay 16 when the voltage of battery 31 drops due to aging or other causes. If battery 31 is removed, capacitor 40 holds sufficient charge to maintain the program settings in memory 15 for at least one minute. When battery 31 is new, current from capacitor 40 is not usually required to operate latching relay 16.

Low-battery detectors that sense voltage often use a battery that produces a relatively high over-voltage, such as providing a third AA alkaline battery in series to produce 4.5 VDC. However, such high over-voltages can cause thermostat controller 12 to malfunction, and in a particular instance causes all fields of the LCD (see FIG. 3) to turn on. Reducing the over-voltage to the operating voltage also wastes battery power. With low battery detector 38 of thermostat 10, thermostat 10 can operate off of power from diode bridge converter 22 and/or triac converter 24 even if battery 31 is omitted. However, battery 31 must be installed for proper operation of low battery detector 38.

With power from diode bridge converter and/or triac, thermostat controller 12 continues to operate when the battery voltage drops to 2.5 V. Low battery detector 38 turns ON when the battery voltage drops to about 2.6 V, and basically measures the voltage of battery 31 to ground. The internal impedance of the battery increases as the battery voltage decreases. The source impedance of power supply 20 is essentially constant. The low battery detector 38 will follow the battery voltage down until the batteries' internal impedance is higher than the source impedance of power supply 20, which occurs at a battery voltage of about 2.6 V. Then the power supply 20 will keep the voltage from dropping any lower, and the low battery detector 38 turns on a "LOW BAT" field on a liquid-crystal display ("LCD") (see FIG. 3, ref. num. 111) of thermostat 10. Thus, the user is alerted to a low-battery condition even when thermostat 10 is operating off of AC power. If AC power is not available, thermostat 10 continues to operate off of battery 31 after low battery detector 38 indicates a low-battery condition until the battery voltage drops to about 2.5 V.

II. Use of Thermostat with Exemplary Heating Systems

Figure 2A:
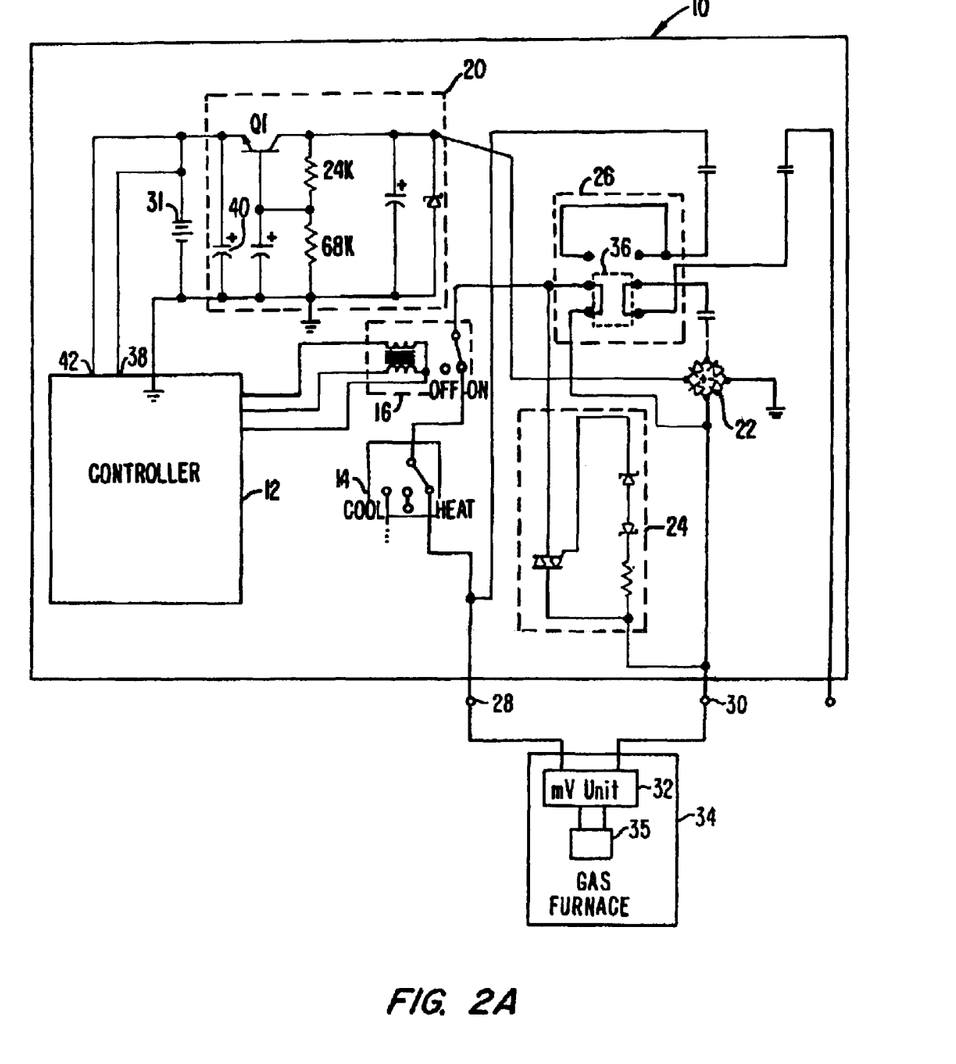
FIG. 2A is simplified circuit diagram of the thermostat shown in FIG. 1 using battery power to control a gas millivolt heating system.

FIG. 2A is a simplified circuit diagram of thermostat 10 of FIG. 1 using battery power to control a gas millivolt heating system. A millivolt unit 32 of a gas millivolt furnace 34 is connected to heating load terminal 28 and heating transformer power terminal 30 of thermostat 10. Millivolt unit 32 is a thermoelectric device that generates a small electric signal (about 750 mV) from the heat of the pilot light of the gas furnace for operating gas valve 35 of gas millivolt furnace 34. Shorting heating load terminal 28 to heating transformer power terminal 30 of millivolt unit 32 through latching relay 16, which is controlled by thermostat controller 12, and MODE switch 14 turns on gas millivolt furnace 34. Dual jumper 36 of power source selector 26 is set to a first position (as shown) when thermostat 10 is installed for operating thermostat controller 12 off of battery 31. Dual jumper 36 connects heating transformer power terminal 30 directly to heating load terminal 28 when latching relay 16 is ON, bypassing triac converter 24. Two AA alkaline batteries in series provide about 3 VDC, and can typically power thermostat 10 for over one year. When battery 31 runs down, thermostat 10 will stop working; however, thermostat 10 will indicate when battery 31 is low before the battery voltage drops too low to operate thermostat 10.

Figure 2B:
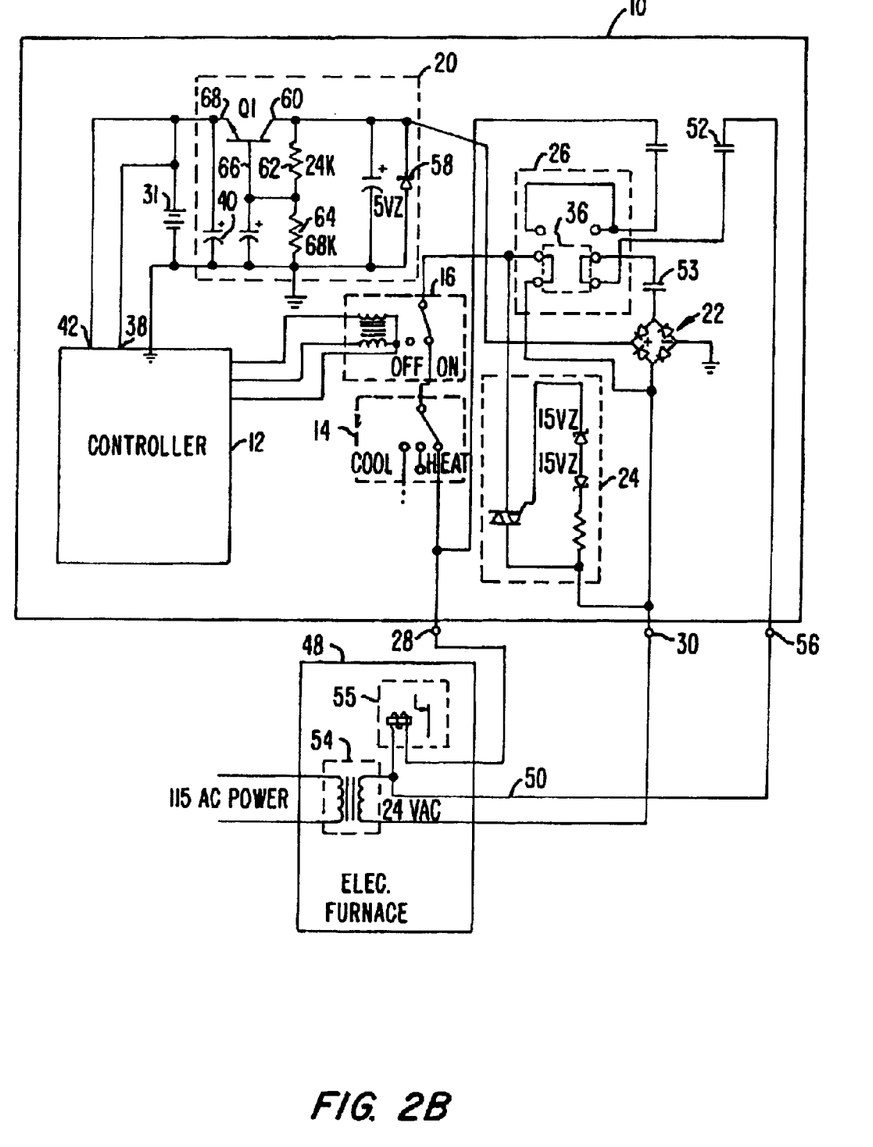
FIG. 2B is a simplified circuit diagram of the thermostat of FIG. 1 using power from a diode bridge converter to control a gas or electric heater that has a common wire.

FIG. 2B is a simplified circuit diagram of thermostat 10 of FIG. 1 using diode bridge converter 22 to control a gas or electric heating system 48 that has a common wire ("C-wire") 50. Heating system 48 includes a transformer 54 that steps down 115 V, 60 Hz electrical power to provide 24 VAC between heating load terminal 28 and heating transformer power terminal 30 to operate furnace relay 55. Twenty-four VAC is also present between Common terminal 56 and heating transformer power terminal 30. Transformer 54 typically provides about one Amp of current. Dual jumper 36 is in the first position (as shown) when operating off of power from C-wire 50, as it is when operating a gas millivolt system off of battery 31 (see FIG. 2A).

Twenty-four VAC power from C-wire 50 is supplied through capacitor 52, dual jumper 36, and capacitor 53 to diode bridge converter 22. Capacitor 52 limits the current available at diode bridge converter 22 without generating the heat that would be generated with a current-limiting resistor. Using capacitor 52, rather than a resistor, as a current-limiting device in thermostat 10 is particularly desirable because capacitor 52 and other components are within a housing of thermostat 10, and it is estimated that an equivalent current-limiting resistor would raise the temperature inside the housing 20° F. in twenty minutes at an ambient temperature of 70° F. In a particular embodiment, capacitor 52 is a 0.47 micro-Farad non-polar capacitor. Capacitor 53 is a 2.2 micro-Farad non-polar capacitor.

Diode bridge converter 22 draws about 13 mA from the 24 VAC. Zener diode 58 clamps the voltage at collector 60 of transistor Q1 at about 5 Volts. A voltage divider includes resistor 62, which is 24 kOhms, in series with resistor 64, which is 68 kOhms, thus the voltage at base 66 of transistor Q1 is 3.6 V, and the voltage at emitter 68 of transistor Q1 is 3.1+0.1 VDC. The voltage at emitter 68 is usually slightly higher than the voltage from battery 31 when operating off of C-wire 50 power and the output impedance of transistor Q1 is higher than the internal impedance of battery 31. When thermostat 10 operates off of power from C-wire 50, battery 31 lasts much longer than if thermostat 10 operated only off of battery power. If power from C-wire 50 is lost, thermostat 10 automatically runs off of battery 31, if available. Conversely, thermostat 10 will continue to work if C-wire power is available and battery 31 is dead or missing.

Thermostat 10 can "borrow" operating power from the relay current if the operating current is a small portion (typically under 10%) of the total relay current. For example, if the operating current is about 13 mA and the relay current is 200 mA, the operating current used for the power supply is only about 7% of the relay current. If the relay current is less than about 130 mA, borrowing operating power from relay current might affect system performance. For example, the relay might not open, or the relay might chatter or hum. Older furnaces often draw more than 200 mA for the relay current, thus borrowing operating power from the relay current in these older furnaces does not adversely affect their operation. Some newer furnaces draw less than 100 mA for the relay current, and the C-wire, if available, is used to power thermostat 10, as discussed above in reference to FIG. 2B.

Figure 2C:
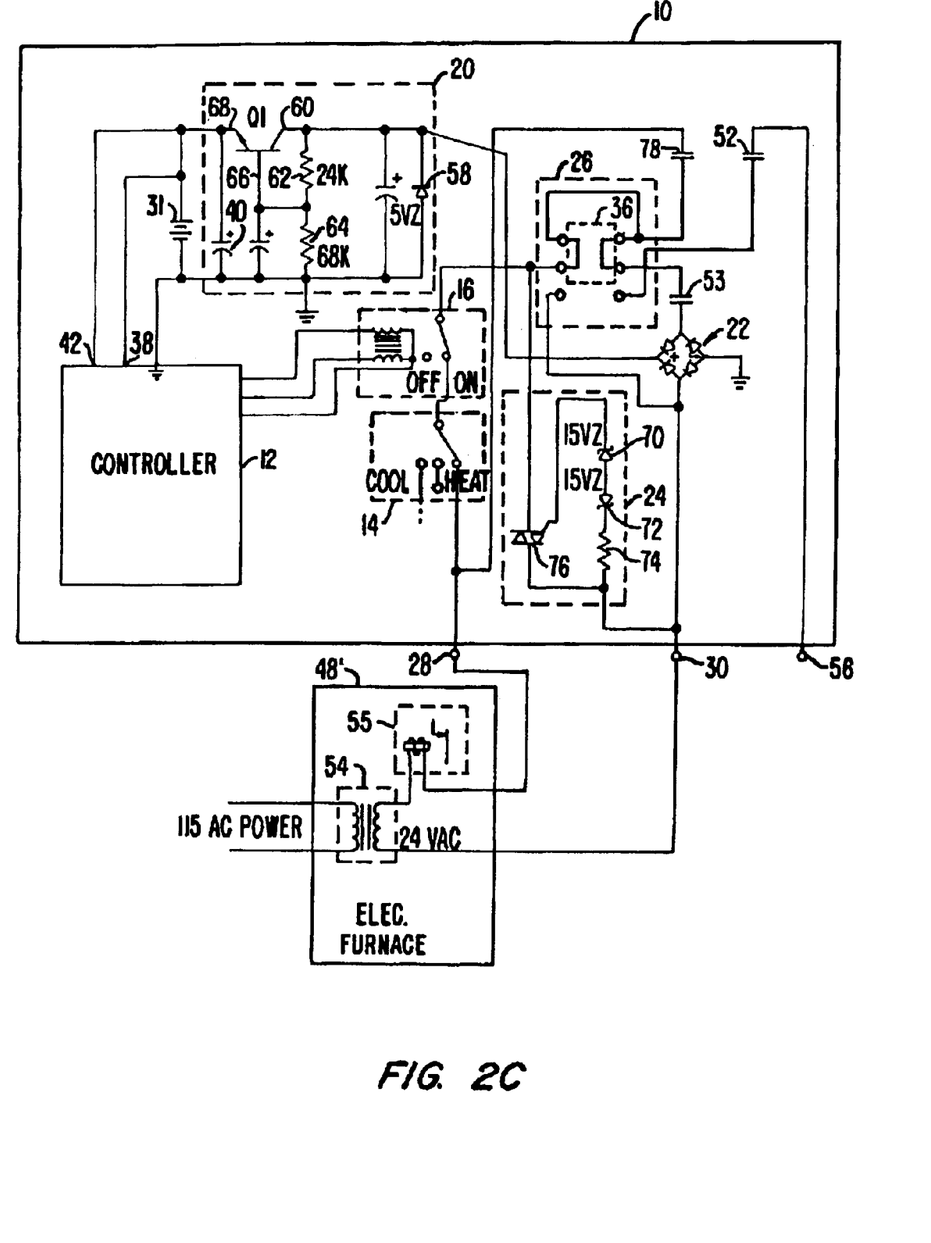
FIG. 2C is a simplified circuit diagram of the thermostat of FIG. 1 using power from a triac converter and a diode bridge converter to control a gas or electric heater that does not have a common wire.

FIG. 2C is a simplified circuit diagram of thermostat 10 of FIG. 1 using power from triac converter 24 to control a gas or electric heating system 48, that does not have a C-wire, but that does have transformer 54 to operate furnace relay 55. With dual jumper 36 in a second position (as shown), latching relay 16 ON, and mode switch 14 in HEAT, there are essentially zero volts across heating load terminal 28 and heating transformer power terminal 30. However, triac converter 24 is in series between heating load terminal 28 and heating transformer power terminal 30.

Back-to-back Zener diodes 70, 72 and resistor 74 allow AC voltage to appear across triac 76 for a short portion of the phase without turning on triac 76. Both Zener diodes 70, 72 are fifteen-volt Zener diodes, and resistor 74 is a 4.7 kOhm resistor. About 10° of phase delay is produced. After this phase delay, triac 76 conducts current to operate furnace relay 55. Control of furnace relay 55 by thermostat 10 is not significantly affected by the short phase delay of triac 76. Turning triac 76 on after the phase delay creates small voltage spikes across triac 76 at 120 Hz. These 120 Hz voltage spikes are coupled through capacitor 53 to diode bridge converter 22. Diode bridge converter 22 converts the voltage spikes to DC, which is provided to power supply 20. About 5 mA of current is provided to power supply 20, which provides regulated 3 VDC to thermostat controller 12.

When latching relay 16 is OFF, or with mode switch 14 OFF or in COOL, there is no current flowing between heating transformer power terminal 30 and heating load terminal 28 for triac converter 24 to use. However, there is 24 VAC across heating transformer power terminal 30 and heating load terminal 28, which is coupled to diode bridge converter 22 through capacitor 78. Capacitor 78 is a 0.47 micro-Farad non-polar capacitor, which limits the current supplied to diode bridge converter 22, as discussed in conjunction with capacitor 52 in FIG. 2B. The 24 VAC is rectified to DC and provided to power supply 20. Thus, power is supplied to theromostat controller 12 even when latching relay 16 is OFF or mode switch 14 is OFF or in COOL.

III. Exemplary Touch Screen Display and User Interface

Figure 3:
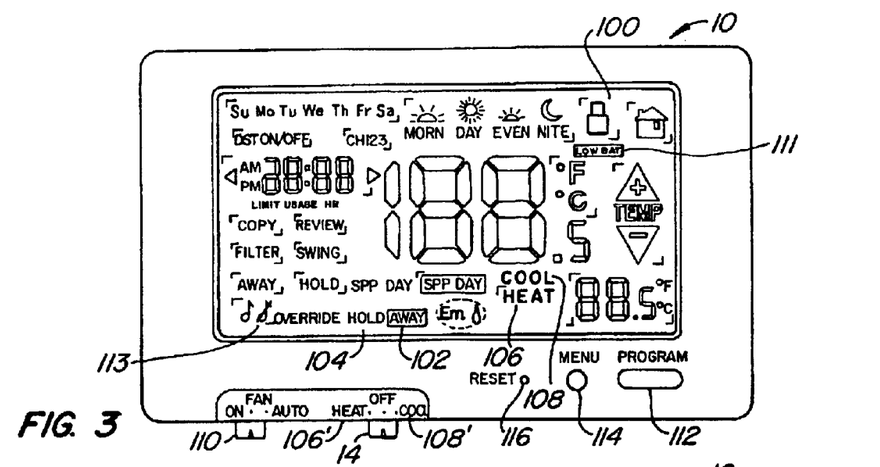
FIG. 3 is a front view of an exemplary thermostat with a touch-screen display.

FIG. 3 is a simplified front view of thermostat 10. Thermostat 10 has a touch-screen LCD 100 measuring about 51 mm×95 mm (2 inches×3.75 inches), although this size is merely exemplary and touch screens having other dimensions have been fabricated for use in thermostats according to other embodiments of the present invention. All icons (also known as fields) of touch-screen LCD 100 are shown, which looks cluttered; however, only certain subsets of the icons appear on touch-screen LCD 100 at each level (mode) of operation of thermostat 10. Some of the icons simply display information, and touching these icons has no effect. Other icons are touch icons, and touching a touch icon enters user inputs to the CPU (see FIG. 1, ref. num. 11).

Displaying only subsets of the icons reduces the amount of information presented to the user at each level, i.e. at any one time. The relatively large format of touch-screen LCD 100 enables large, easily readable text and large touch icons. The text the user needs to read is displayed on the touch-screen LCD at one of the levels, and the large touch icons facilitate accurate data entry. The touch icons are generally square or rectangular, and in one embodiment each touch icon has a minimum dimension greater than or equal to about 0.25 inches. In a particular embodiment the smallest touch icon is about 0.38×0.25 inches.

Conventional thermostats often have a much smaller LCD screen and use relatively small pressure-sensitive keys to operate and/or program the thermostat. Conventional LCD screens are typically used to display both operational functions and programming states and data. Such LCD screens are called "shared" displays. In many cases a set of instructions explaining the steps that must be taken to operate the thermostat is printed on the thermostat or separately documented, as programming such a thermostat can be quite confusing and tedious. Although programmable thermostats hold out the promise of reducing the energy used by heating systems, the U.S. Environmental Protection Agency, which provides the ENERGY STAR certification for appliances and other devices, has expressed concern that potential energy savings are not being realized because of the difficulties consumers face trying to program conventional thermostats.

Thermostat 10 is unique in display and operation. Instead of having one small shared screen for all the information and programming, touch-screen LCD 100 changes as the user enters different levels of operation, each level being intuitive from the previous level and displaying much more information at each level than is typically provided on a conventional shared display. Some icons indicate which mode of operation the thermostat is in. For example, AWAY indicator icon 102 flashes if thermostat 10 is in AWAY mode, and HOLD indicator icon 104 flashes if thermostat 10 is in HOLD mode (discussed below in conjunction with FIG. 4B). Similarly, HEAT indicator icon 106 is activated if MODE switch 14 is set to HEAT 106', and COOL indicator icon 108 is activated if MODE switch 14 is set to COOL 108'.

MODE switch 14 is provided as a slider switch at the bottom of thermostat 10, as is FAN switch 110. Thermostat 10 is programmed by pressing PROGRAM button 12, and then entering the desired programming information through touch-screen LCD 100 (discussed below in conjunction with FIG. 4C). Similarly, MENU mode is accessed by pressing MENU button 114 (discussed below in conjunction with FIG. 4D). Reset button 116 is recessed and resets thermostat 10 to factory default settings when depressed. A sharpened pencil or the end of a straightened paper clip is used to depress reset button 116.

Figure 4A:
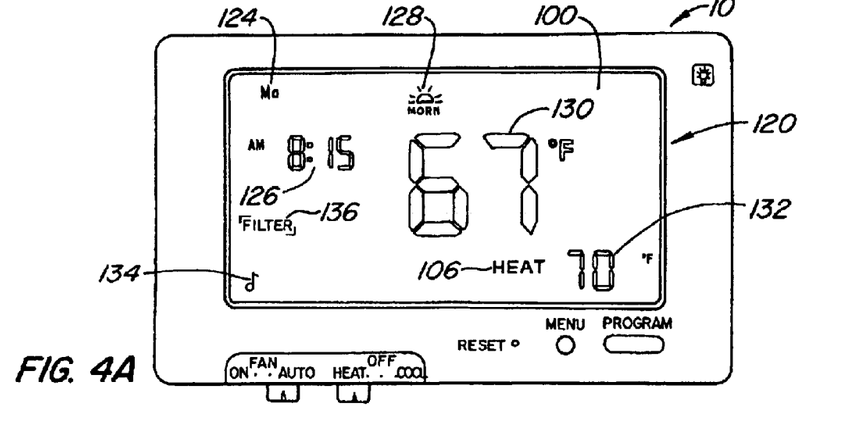
FIG. 4A is a screen shot of a first screen of the touch-screen display of FIG. 3 when the thermostat is in a first level.

FIG. 4A is a screen shot of HOME SCREEN 120 of touch-screen LCD 100 when thermostat 10 is in HOME level. HOME level is the level from which other levels are accessed. Thermostat 10 reverts to HOME level from other levels after a default period (e.g. about 60 seconds), or when the HOME icon is touched (see FIG. 4B, ref. num. 22).

In HOME level, touch-screen LCD 100 displays one of the current day icons 124 ("Mo"), current time icon 126 ("AM 8:15"), one of the period of day icons 128 ("MORN"), room temperature icon 130 ("67° F."), which is a touch icon, current set-point temperature icon 132 ("70° F."), a HEAT indicator icon 106 (when MODE switch 14 is set to HEAT), tone indicator icon 134, and filter indicator icon 136.

Filter indicator icon 136 measures the on-time of latching relay 16, which indicates that the HVAC system has operated a pre-selected number of hours, and that it is time to change the air filter of the HVAC system. Measuring the on-time of latching relay 16 enables the filter indicator feature even for gas heating systems in which the furnace turns on the system fan independently of the thermostat. When tone indicator icon 134 is solid it means that thermostat 10 will beep each time a touch icon is activated (touched), and when tone indicator icon is crossed out or outlined (see FIG. 3, ref. num. 113), the beep will not sound. There are three ways to leave HOME level and enter a lower level. Touching room temperature icon 130 in HOME SCREEN 120 changes the touch-screen LCD 100 to TEMPORARY SCREEN.

Figure 4B:
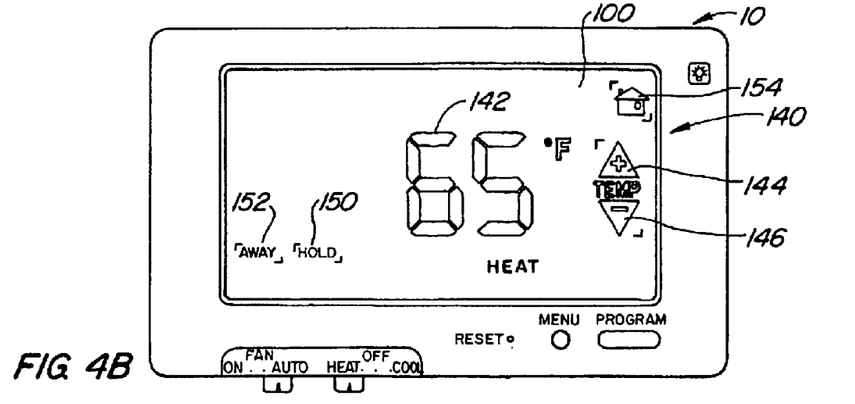
FIG. 4B is a screen shot of a second screen of the touch-screen display of FIG. 3 when the thermostat is in a second level.

FIG. 4B is a screen shot of TEMPORARY SCREEN 140 of touch-screen LCD 100 when thermostat 10 is in TEMPORARY level. TEMPORARY level is accessed from the HOME level when the user touches the room temperature icon (see FIG. 4A, ref. num. 130). TEMPORARY SCREEN 140 allows the user to change the target temperature without affecting the operating program of thermostat 10, which is stored in memory. TEMPORARY SCREEN 140 displays the target temperature 142, temperature UP 144 and DOWN 146 arrows, HOLD touch icon 150, and AWAY touch icon 152 all at the same time. After the user enters a change by touching the appropriate icon on TEMPORARY SCREEN 140, the user can return to HOME SCREEN by touching HOME touch icon 154. If the temperature is changed in the TEMPORARY level (without using HOLD or AWAY), the change will immediately take effect, but be cancelled at the start of the next programmed period. Thus the entered change is only temporary.

Touching HOLD touch icon 150 puts thermostat 10 in HOLD mode. HOLD mode maintains the target temperature 142 indicated on TEMPORARY SCREEN 140. For example, if the user was going away for the weekend and wanted to maintain a temperature of 65° F., he would touch HOLD touch icon 150 and use the UP 144 or DOWN 146 arrow key to set target temperature 142 to "65". The user might want to maintain the target temperature so that his home is at a comfortable temperature when he returns, or to maintain an appropriate temperature in the home for pets or plants, for example.

Touch-screen LCD 100 will automatically revert to HOME SCREEN 120 after a few seconds or the user can touch HOME touch icon 154 to return to HOME SCREEN 120. HOLD indicator icon (see FIG. 3, ref. num. 104) will flash on HOME SCREEN 120 when thermostat 10 is in HOLD mode. To take thermostat 10 out of HOLD mode, the user simply touches the current temperature 130 on HOME SCREEN 120 to enter TEMPORARY SCREEN 140 and touches HOLD touch icon 150 a second time.

Touching AWAY touch icon 152 on TEMPORARY SCREEN 140 puts thermostat 10 in AWAY mode. AWAY mode is used when the user will be away for an extended period of time and maintains upper and lower temperature set-points that are stored in memory. In other words, the heater will turn on if the temperature drops below the lower set-point and the cooling system will turn on if the temperature rises above the upper set-point. AWAY mode is convenient for second homes, such as ski cabins. The upper and lower temperature set-points are often set outside the normal comfort range, and provide heating or cooling to avoid damage to the home or for other reasons. For example, a lower set-point of 45° F. will turn on the heating system and avoid water freezing in the home, while an upper set-point of 85° F. will turn the cooling system on to avoid scorching plants. The set-points for AWAY mode are pre-set at the factory, but may be overridden by touching the temperature set arrows 144, 146. After a few seconds, or after touching HOME touch icon 154, touch-screen LCD 100 returns to HOME SCREEN 120. AWAY indicator icon (see FIG. 3, ref. num. 102) flashes on HOME SCREEN 120 when thermostat 10 is in AWAY mode. Upon returning, the user would simply touch the current temperature 130 on HOME SCREEN 120 to enter TEMPORARY SCREEN 140 and touches AWAY touch icon 152 a second time to take thermostat 10 out of AWAY mode.

While conventional thermostats provide features similar to AWAY mode and HOLD mode, they typically require a relatively involved and complicated sequence of serial key strokes, often with small keys that are labeled in difficult-to-read small type. It is believed that users do not use these modes because of the complexity, time, and difficulty of changing to such modes and back again. This causes the user to either leave the thermostat programmed for normal operation, or to turn the system off entirely. The former wastes energy and the latter can result in damage to the home or its contents.

The present invention provides a large-format, intuitive user interface, and provides access to both temporary modes from a single screen that is only one level from HOME SCREEN 120. About the only thing a user needs to remember is how to get to TEMPORARY SCREEN 140, and that is by touching the largest displayed field (i.e. the current temperature) on HOME SCREEN 120, which in a particular embodiment has a touch area of about 1.5 inches×0.75 inches. The remainder of the process is essentially self-documented on the large-format touch-screen LCD by the icons, and a user typically does not need to reference collateral documentation, such as a user's manual, to change from normal operation to a temporary mode and back again. In particular, activation to or from any temporary mode is achievable from TEMPORARY SCREEN 140, which is only a single level (touch entry) from HOME SCREEN 120.

Figure 4C:
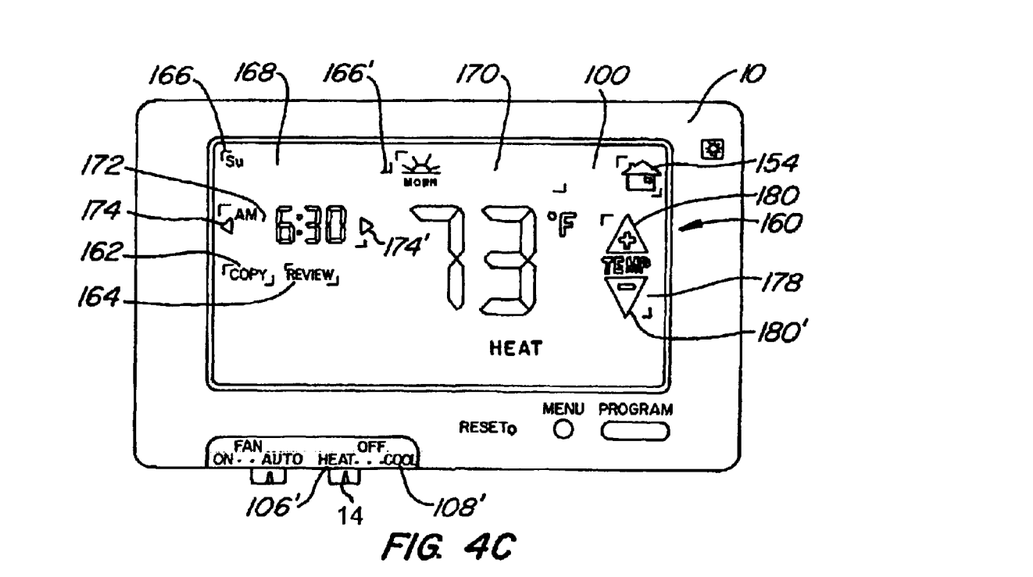
FIG. 4C is a screen shot of a third screen of the touch-screen display of FIG. 3 when the thermostat is in a third level.

FIG. 4C is a screen shot of PROGRAM SCREEN 160 of touch-screen LCD 100 when thermostat 10 is in PROGRAM mode. PROGRAM SCREEN 160 shows all the programming functions for a single day, and COPY icon 162 and REVIEW icon 164 on one screen. The PROGRAM SCREEN enables programming of thermostat 10 that is so intuitive that it is believed most users would not need additional programming instructions. HEAT indicator icon 106 (when MODE switch 14 is set to HEAT 106) indicates that the user is programming the heating mode. The user can program the cooling mode by switching MODE switch 14 to COOL 108'.

Values for the thermostat operating program stored in the programmable memory (see FIG. 1, ref. num. 15) are entered through touch icons displayed on PROGRAM SCREEN 160. Touch icon areas are indicated on PROGRAM SCREEN 160 by sets of corner brackets 166, 166'. Touching day touch icon 168 within corner brackets 166, 166' steps (increments) the current day icon to the next day to select the day that the user is programming. Similarly, touching period of day touch icon 170 within the corner brackets increments the period of day icon to select the period of day the user is programming. Four periods of day are available, morning ("MORN"), day ("DAY"), evening ("EVEN"), and night ("NITE") (see FIG. 3), thus thermostat 10 can be programmed to maintain four different temperatures, one for each period of day for each day of the week. Alternatively, there are more or fewer periods per day, such as two periods or six periods.

Each day of the week can have the four periods start at different times, and each period of each day can be programmed for a different temperature. Time touch icon 172 has arrows 124, 124' that increase or decrease the time in fifteen-minute intervals to program the time the heating program begins for the selected day and period. Set temperature touch icon 178 also has arrows 180, 180' that increase or decrease the set-point temperature for the day and period of day selected. Incrementing the day or period of day automatically enters the time and temperature for the previously selected day or period of day. The user can program four different target temperatures each day, one for each period of day, and the user can program each period of day to start at a different time each day of the week.

Touching COPY touch icon 162 copies the selected times and temperatures from one day to another. For example, if the user programs thermostat 10 for Sunday ("Su"), touching COPY touch icon 162 once will cause the Monday day icon ("Mo") to flash. Touching COPY touch icon 162 again will increment day icon 168 to "Mo" and copy the program values for Sunday into Monday. From there, the user can select another day or period of day, or can copy the program to Tuesday ("Tu"). Thus, a user can quickly, easily, and intuitively program thermostat 10 for different times and temperatures for each day of the week.

Touching REVIEW touch icon 164 automatically steps through the programmed values every five seconds so that the user can see how thermostat 10 is programmed. Touching REVIEW while the programmed values are being reviewed stops the review sequence. Touch-screen LCD 100 will return to the HOME SCREEN 120 a few seconds after the last touch entry, or the user can return to the HOME SCREEN 120 by touching HOME touch icon 154. Entered values are stored in a programmable memory (see FIG. 1, ref. num. 15) in thermostat 10.

Figure 4D:
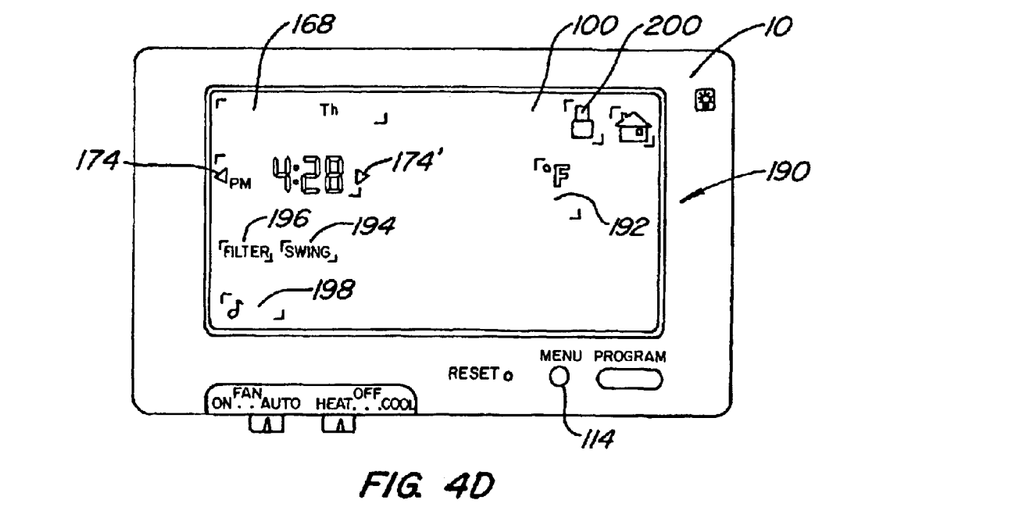
FIG. 4D is a screen shot of a fourth screen of the touch-screen display of FIG. 3 whein the thermostat is in a fourth level.

FIG. 4D is a screen shot of MENU SCREEN 190 of touch-screen LCD 100 when thermostat 10 is in MENU mode. MENU mode is entered from HOME SCREEN 120 by pressing MENU button 14. MENU SCREEN 190 shows several set-up touch icons at one time. The set-up touch icons include touch icons for setting the current day and current time using day touch icon 168 and arrows 174, 174', respectively, setting the temperature to DC or °F. by touching temperature scale touch icon 192, setting the temperature swing (hysteresis) by touching SWING touch icon 194, and then incrementing the swing using arrows 174, 174'. The filter running time is reset by touching FILTER icon 196 and then left arrow 174 on the filter time. The filter set time is set by touching and holding FILTER icon 196 for three seconds, and then changing the set time using the arrows 174, 174'. The tone is turned on or off by touching TONE touch icon 198. Touching LOCK touch icon 200 locks the thermostat operating program stored in memory. When thermostat 10 is locked, a user cannot change the thermostat operating program from PROGRAM SCREEN 160 without first unlocking thermostat operating program from MENU SCREEN 190. On most conventional thermostats, including thermostats with LCD displays, each function, if available, is displayed separately, requiring the user to step though a long sequence of screens to get to the final desired menu level.

IV. Exemplary Methods

Figure 5A:
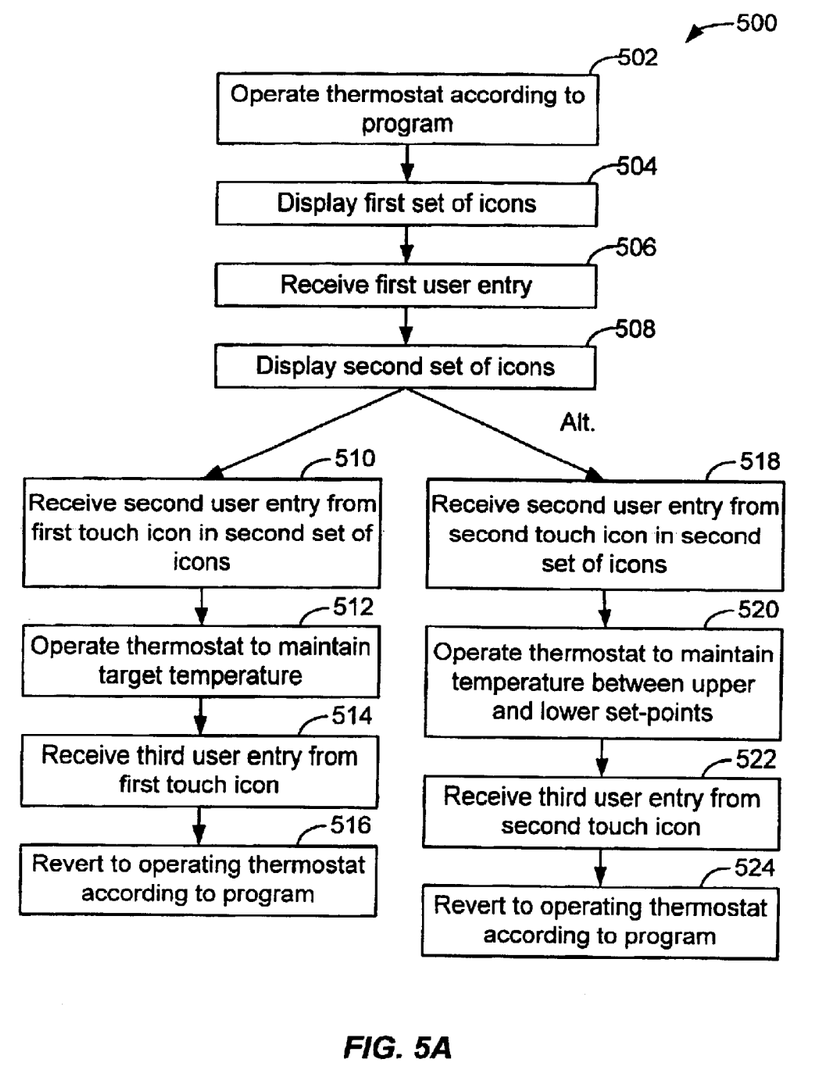
FIG. 5A is a simplified flow chart of a method of operating a thermostat with a touch-screen display and a memory according to an embodiment of the present invention.

FIG. 5A is a simplified flow chart of a method 500 of operating a thermostat with a touch-screen display and a memory according to an embodiment of the present invention. The thermostat initially operates according to a thermostat operating program stored in the memory (step 502), and the touch-screen display displays a first set of icons (e.g. the HOME screen of FIG. 4A) (step 504). The thermostat optionally stores high and low temperature limits for a temporary operating mode. When operating according to the thermostat operating program, the thermostat is intended to control a healer to maintain a room temperature at or above a current program temperature, for example. It is understood that the heater is not part of the thermostat, but some heaters provide operating power to the thermostat Upon receiving a first user entry (step 506) the touch screen displays a second set of icons (step 508) including at least a first temporary mode touch icon (e.g. FIG. 4B, ref. num. 150), a second temporary mode touch icon (e.g. FIG. 4B, ref. num. 152), and a target temperature icon (e.g. FIG. 4B, ref. num. 142). In one embodiment, the first user input is indicative of touching a first touch icon (e.g. room temperature icon 130 shown in FIG. 4A). In another embodiment, the first user input is indicative of touching a button.

In a further embodiment, upon receiving a second user entry indicative of touching the first temporary mode icon (step 510), the thermostat operates to maintain a target temperature according to the target temperature icon (step 512). That is, the thermostat controls the heating system to maintain the room temperature within a preseleted range above and below the target temperature. Upon receiving a third user entry indicative of touching the first temporary mode icon a second time (step 514), the thermostat reverts to operating according to the thermostat operating program (step 516).

In an alternative embodiment, upon receiving a second user entry indicative of touching the second temporary mode icon (step 518), the thermostat operates to maintain a temperature between the high and low temperature limits stored in memory (step 520). When the thermostat receives a third user entry indicative of touching the second temporary mode icon a second time (step 522), the thermostat reverts to operating according to the thermostat operating program (step 524).

Figure 5B:
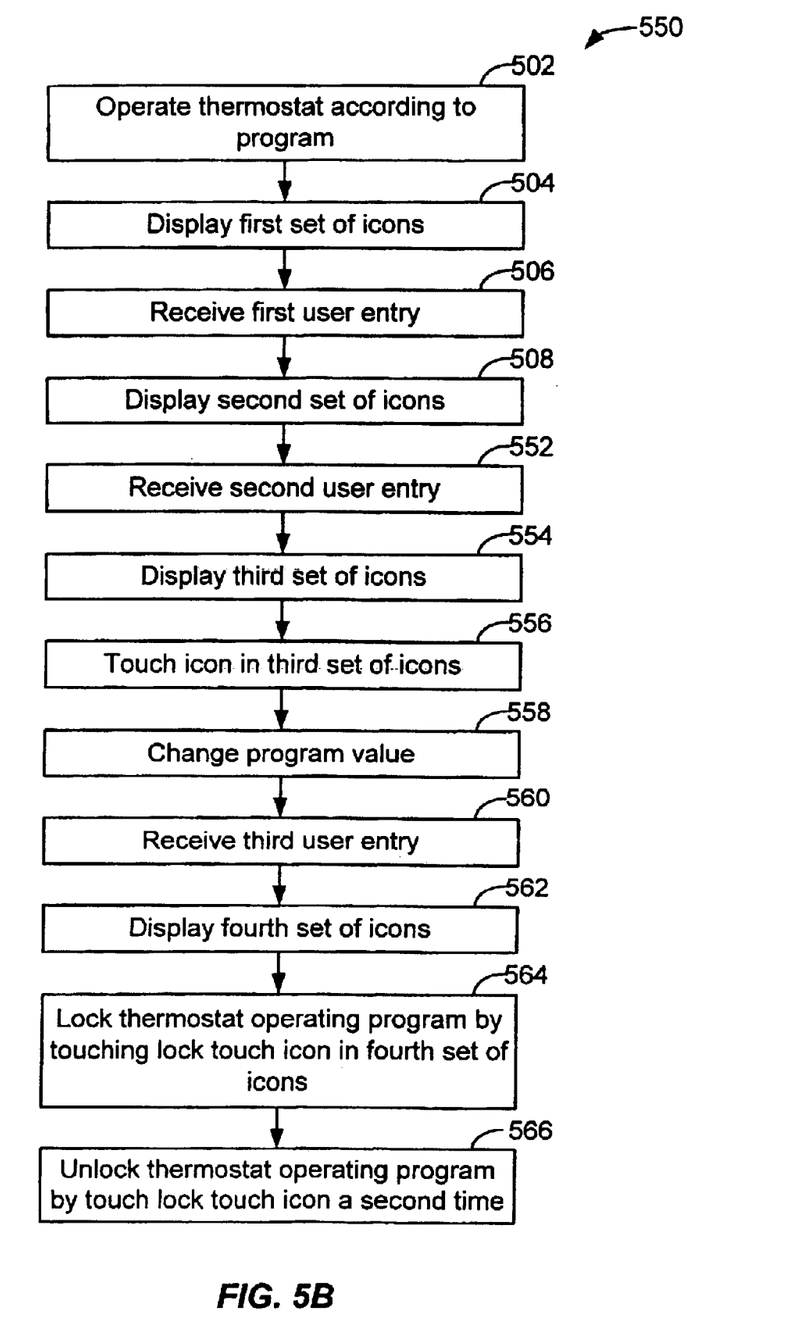
FIG. 5B is a simplified flow chart of a method of operating a thermostat with a touch-screen display and a programmable memory according to another embodiment of the present invention.

FIG. 5B is a simplified flow chart of a method 550 of operating a thermostat with a touch-screen display and a programmable memory according to another embodiment of the present invention. The thermostat initially operates according to a thermostat operating program stored in the programmable memory (step 502), and the touch-screen display displays a first set of icons (e.g. HOME screen 120 shown in FIG. 4A) (step 504).

Upon receiving a first user entry (step 506), the touch-screen displays a second set of icons (e.g. TEMPORARY screen 140 shown in FIG. 4B) (step 508) including at least a first temporary mode touch icon (e.g. FIG. 4B, ref. num. 150), a target temperature icon (e.g. FIG. 4B, ref num. 142), and a second temporary mode touch icon (e.g. FIG. 4B, ref. num. 152). In one embodiment, the first user input is indicative of touching a first touch icon (e.g. room temperature icon 130 shown in FIG. 4A).

Upon receiving a second user entry (step 552), the touch screen display displays a third set of icons (e.g. PROGRAM screen 160 shown in FIG. 4C) (step 554) that includes a plurality of touch icons for entering thermostat operating program values into the programmable memory. Touching one of the plurality of touch icons (step 556) changes a program value of the thermostat operating program (step 558)

In a further embodiment, upon receiving a third user entry (step 560), a fourth set of icons is displayed on the touch-screen display (step 562). The fourth set of icons includes a lock touch icon. The thermostat operating program is locked from being changed (step 564) by touching the lock touch icon. The thermostat operating program is unlocked by touching the lock touch icon a second time (step 566).

Modification and variation can be made to be disclosed embodiments without departing from the subject of the invention as described herein. Any and all patents, patent applications, and printed publications referred to above are incorporated by reference.

What is claimed is:

1. A thermostat comprising:
    a heating transformer power terminal;
    a heating load terminal;
    a common terminal; and
    a power source selector configurable to operate the thermostat from alternating-current voltage provided between the common terminal and the heating load terminal when the power source selector is in a first position, and to operate the thermostat from alternating-current voltage provided between the heating transformer power terminal and the heating load terminal when the power source selector is in a second position.

2. The thermostat of claim 1 further comprising a battery wherein the thermostat operates from battery power when alternating-current voltage is not provided to the thermostat.

3. The thermostat of claim 1 further comprising a battery and a low-battery detector that senses battery voltage and indicates a low battery condition when the battery voltage drops below a pre-selected limit.

4. The thermostat of claim 3 further comprising a thermostat controller configured to operate at an operating voltage, the pre-selected limit being greater than the operating voltage by about 0.1 V.

5. The thermostat of claim 1 further comprising:
    a power supply;
    a thermostat controller;
    a diode bridge converter; and
    a battery providing a battery voltage to the thermostat controller, wherein the diode bridge converter converts alternating-current voltage to direct-current voltage that is coupled to the power supply, the power supply regulating the direct-current voltage and providing a regulated direct-current voltage to the thermostat controller, the regulated direct-current voltage being greater than the battery voltage.

6. The thermostat of claim 5 wherein the battery has an internal impedance and the power supply has an output impedance, the output impedance being greater than the internal impedance.

7. The thermostat of claim 5 further comprising:
    a diode bridge converter; and
    a triac converter; wherein the triac converter provides voltage spikes to the diode bridge converter when the heating transformer power terminal is coupled to the heating load terminal through the triac converter when the power source selector is in the second position, and the heating transformer power terminal is coupled to the heating load terminal bypassing the triac converter when the power source selector is in the first position.

8. The thermostat of claim 7 wherein the diode bridge converter converts alternating-current voltage between the heating transformer power-terminal and the heating load terminal when the power source selector is in the second position and the heating load terminal is not coupled to the heating load terminal through the triac converter.

9. The thermostat of claim 7 wherein alternating current is coupled to the diode bridge converter through a limiting capacitor.

10. A thermostat comprising:
    a heating transformer power terminal;
    a heating load terminal;
    a common terminal;
    a diode bridge converter;
    a triac converter; and
    a power source selector configurable to operate the thermostat from alternating-current voltage provided between the common terminal and the heating load terminal when the power source selector is in a first position, and to operate the thermostat from alternating-current voltage provided between the heating transformer power terminal and the heating load terminal when the power source selector is in a second position, the triac converter providing voltage spikes to the diode bridge converter when the heating transformer power terminal is coupled to the heating load terminal through the triac converter when the power source selector is in the second position, and the diode bridge converter converting alternating-current voltage between the heating transformer power terminal and the heating load terminal when the power source selector is in the second position and the heating load terminal is not coupled to the heating load terminal through the triac converter, the heating transformer power terminal being coupled to the heating load terminal bypassing the triac converter when the power source selector is in the first position.

11. The thermostat of claim 10 wherein alternating current to the diode bridge converter is limited by a capacitor.

12. The thermostat of claim 10 further comprising:

a thermostat controller, a battery providing a battery voltage to the thermostat controller; and a power supply providing a regulated direct-current voltage to the thermostat controller, the regulated direct-current voltage being greater than the battery voltage.

13. A thermostat comprising:

a heating transformer power terminal;

a heating load terminal;

a common terminal;

a thermostat controller;

a power supply providing a regulated direct-current voltage to the thermostat controller;

a battery providing a battery voltage to the thermostat controller, the battery voltage being less than the regulated direct-current voltage;

a power source selector having a first position and a second position;

a diode bridge converter providing direct-current voltage to the power supply, wherein the diode bridge converter converts alternating-current voltage provided between the heating load terminal and the common terminal when the power source selector is in the first position, and converts alternating-current voltage provided between the heating load terminal and the heating transformer power terminal when the power source selector is in the second position.

14. The thermostat of claim 13 wherein alternating current is coupled to the diode bridge converter through a limiting capacitor.

15. The thermostat of claim 13 further comprising a low-battery detector configured to sense a battery voltage and to indicate a low battery condition when the battery voltage drops below a pre-selected limit.

* * * * *